United States Patent [19]

Yang

[11] Patent Number: 4,688,816
[45] Date of Patent: Aug. 25, 1987

[54] MULTIPLE-WHEEL CYCLE

[76] Inventor: Tzu-Tsan Yang, P.O. Box 13-118, Taipei, Taiwan

[21] Appl. No.: 934,480

[22] Filed: Nov. 24, 1986

Related U.S. Application Data

[63] Continuation-in-part of Ser. No. 840,449, Mar. 17, 1986.

[51] Int. Cl.$^4$ .............................................. B62K 5/00
[52] U.S. Cl. .................................. 280/239; 280/261; 280/284; 180/230
[58] Field of Search ............... 280/230, 239, 261, 274, 280/275, 284, 285; 180/230, 227, 15, 210, 217; 474/148, 88

[56] References Cited

U.S. PATENT DOCUMENTS

| | | | |
|---|---|---|---|
| 3,224,523 | 12/1965 | Ross | 180/210 |
| 3,638,746 | 2/1972 | Gostomski | 180/210 |
| 3,843,145 | 10/1974 | Templeton | 280/261 |
| 4,398,740 | 8/1983 | Clem | 280/261 |

Primary Examiner—John J. Love
Assistant Examiner—Donn McGiehan

[57] ABSTRACT

A multiple-wheel cycle includes a front wheel and two rear wheels respectively driven by two chainwheels formed on a driving shaft rotatably mounted on a bottom bush of a seat tube of the cycle frame so that the three wheels having their centers projectively aligned all contact the ground surface to increase their friction with the ground for stable running and less slippery of the cycle.

4 Claims, 7 Drawing Figures

MULTIPLE-WHEEL CYCLE

BACKGROUND OF THE INVENTION

This application is a continuation-in-part of original application of Ser. No. 840,449 pending filed on Mar. 17, 1986.

Original application disclosed a driving mechanism for a cycle including two chainwheels respectively driving a front sprocket and a rear sprocket, but failed to disclose two wheels mounted with the front and rear sprockets to show a more stable and less slippery effect of a cycle having its three wheels running on the ground surface.

Nesbit taught an improved drive for use as between the engine and the clutch or transmission of a motorcycle and as between the clutch or transmission and the drive wheel in his U.S. Pat. No. 3,954,145, but he did not disclose a tricycle having plural rear wheels respectively driven by its driving mechanism so that there are two wheels operatively contacting the ground surface to have an increase of antislipping friction between the wheels and the ground surface.

The present inventor has found these phenomena and invented the present multiple-wheel cycle.

SUMMARY OF THE INVENTION

The object of the present invention is to provide a cycle having multiple wheels, particularly having three wheels alignedly running on the ground, in which two rear wheels are commonly driven by two chainwheels secured to a driving shaft rotatably mounted in a bottom bush of a seat tube to increase the friction between the wheels and the contacting ground for stable and less slippery running of the cycle.

DETAILED DESCRIPTION

Figure 1:
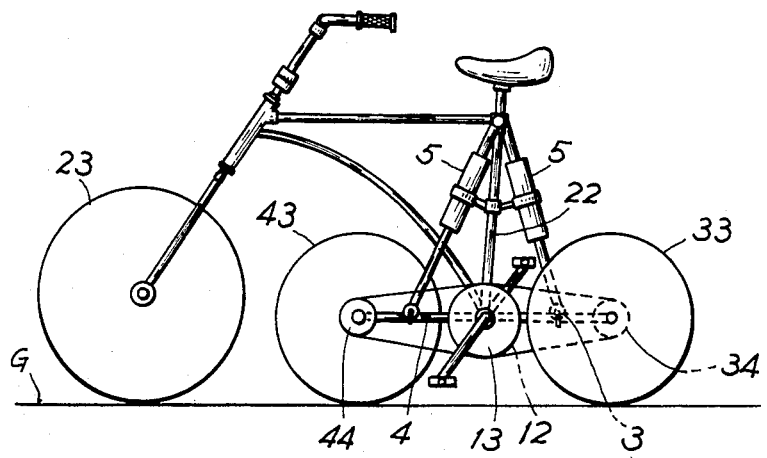
FIG. 1 is an illustration showing the present invention.
Figure 7:
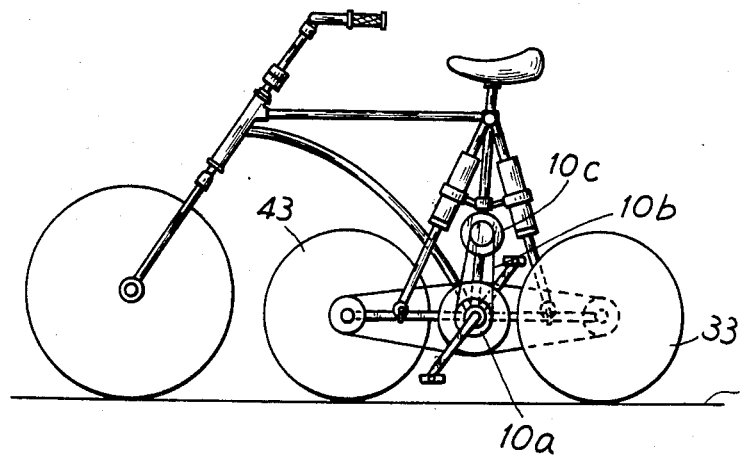
FIG. 7 shows still another preferred embodiment of the present invention.

As shown in FIGS. 1-5, the present invention comprises: a driving means 1 having a driving shaft 10 rotatably mounted in a bottom bush 21 of a seat tube 22 of the cycle frame 2, a right chainwheel 12 and a left chainwheel 13 respectively disposed on two opposite sides of the bottom bush 21; a first rear-wheel means 3 protruding rearwards and driven by the right chainwheel; a second rear-wheel means 4 protruding frontwards and driven by the left chainwheel 13; and a pair of telescopic cushioning rods 5 respectively secured to the seat tube 22 and resiliently tensioning both rear-wheel means 3, 4 against the ground surface G. A pair of pedals 11 are secured to the driving shaft 10 as shown in FIG. 1 for manual operation. However, the driving shaft 10 can be fixed with an engine-coupled sprocket 10a and be mechanically driven by an engine 10c through a chain 10b as shown in FIG. 7 to substitute the manual-operated pedals 11.

The first rear-wheel means 3 includes: a lever 30 having its inner end formed as a collar 31 pivotedly mounted on the bottom bush 21 and having its outer end formed as an axle 32 for rotatably mounting a first rear wheel 33 protruding rearwards from bush 21, a right sprocket 34 secured to the first rear wheel 33 and engaged with a chain 35 coupling the right chainwheel 12 and the right sprocket 34.

Figure 2:
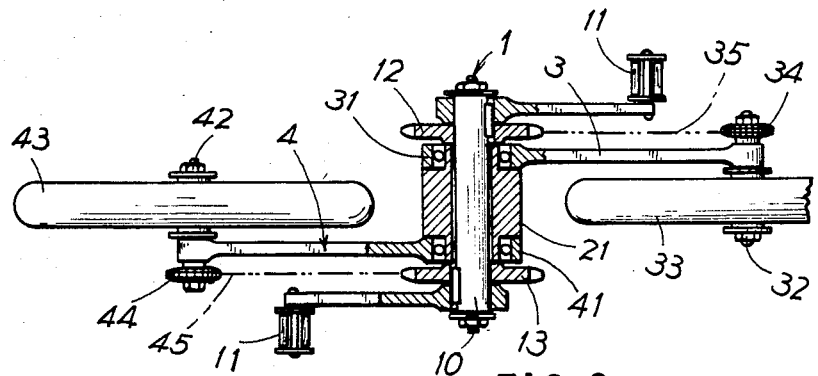
FIG. 2 is a top-view illustration of the present invention.
Figure 4:
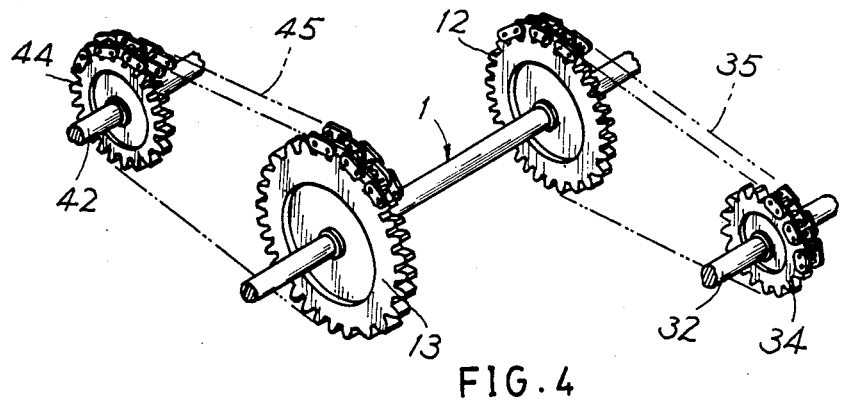
FIG. 4 shows the driving means of the present invention.
Figure 3:
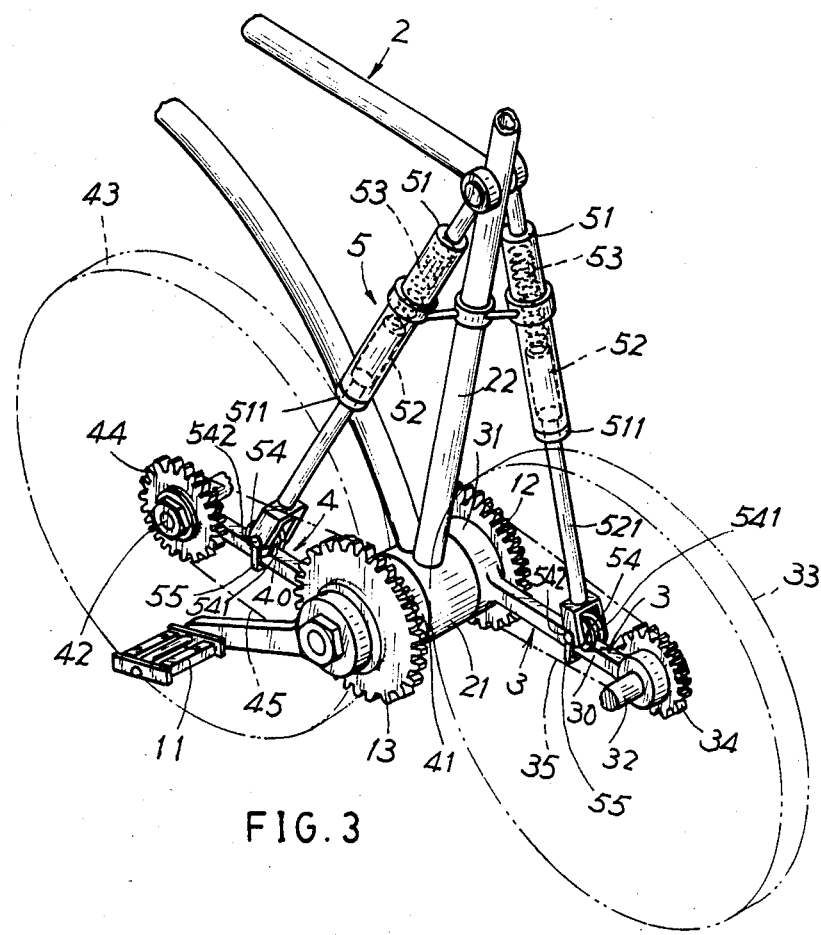
FIG. 3 is a perspective illustration of the present invention.

The second rear-wheel means 4 includes: a lever 40 having its inner end formed as a collar 41 pivotedly mounted on the bottom bush 21 and having its outer end formed as an axle 42 for rotatably mounting a second rear wheel 43 protruding frontwards from bush 21 opposite to the first rear wheel 33, a left sprocket 44 secured to the second rear wheel 43 and engaged with a chain 45 coupling the left chainwheel 13 and the left sprocket 44. All centers of front wheel 23, second rear wheel 43 and first rear wheel 33 are projectively aligned as shown in FIG. 2.

Each telescopic cushioning rod 5 includes an outer cylinder 51 secured to the seat tube 22, an inner cylinder 52 resiliently held within the outer cylinder 51 as normally tensioned downwards by a tensioning spring 53 inserted in the cylinder 51, a cylinder rod 521 protruding downwards under the inner cylinder 52, a roller 54 secured to rod 521 and formed with an annular groove 541 along the roller perimeter to slidingly engage with either lever 30 or 40, and a hook 55 protruding downwards from the roller pin 542 to movably dispose about either lever 30 or 40 with the roller 54. A retainer ring 511 is formed on the lower end of outer cylinder 51 to limit the inner cylinder 52 without releasing from the cylinder 51.

Figure 5:
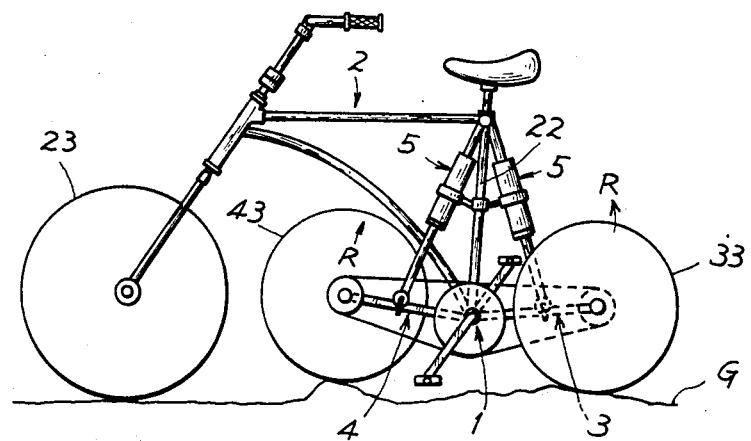
FIG. 5 shows the running of the present invention on an uneven ground.

When running the present invention by depressing the pedals 11 to rotate the two chainwheels 12, 13 to simultaneously drive the two rear wheels 33, 43, all three wheels 23, 43, 33 will contact the ground surface to increase their friction with the ground surface for stable running on a slippery surface, better than those bicycle having only two wheels. If running on an uneven surface as shown in FIG. 5, either rear wheel 43 or 33 will be biased upwards around the central shaft 10 when meeting convex obstacles to exert the adaptability of the present invention even on a corrugated surface. The telescopic cushioning rods 5 provide the cushioning effect for the present invention for comfortable riding of a cycle on the corrugated surface.

Figure 6:
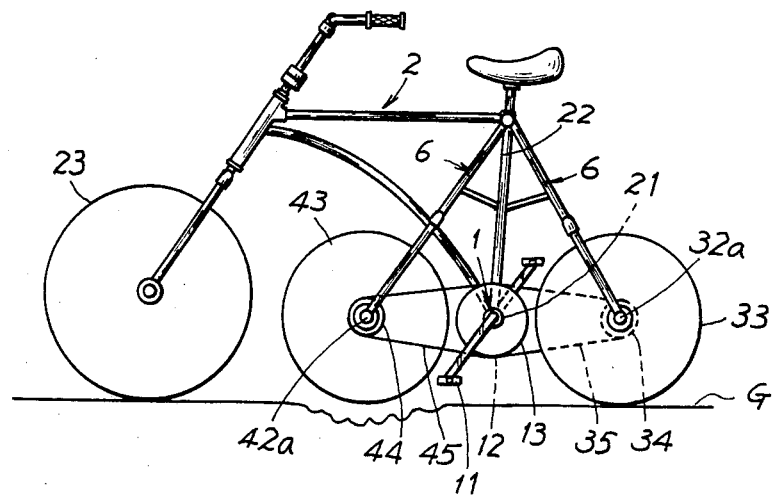
FIG. 6 shows another preferred embodiment of the present invention.

The present invention can be simplified as shown in FIG. 6 to comprise: a driving means 1 having a driving shaft 10 rotatably mounted in a bush of a seat tube 22 and having a right chainwheel 12 and a left chainwheel 13 respectively disposed on two sides of the bush 21 of the seat tube 22, a first rear wheel 33 protruding rearwards from the bush 21 having a sprocket 34 rotatably mounted on an axle 32a formed on the lower portion of a rear fork 6 secured to the seat tube 22 and having the sprocket 34 engaged with a chain 35 coupled to the right chainwheel 12, and a second rear wheel 43 protruding frontwards from the bush 21 opposite to the first rear wheel 33 and having a sprocket 44 rotatably mounted on an axle 42a formed on the lower portion of the other rear fork 6 secured to the tube 22 and engaged with a chain 45 coupled to the left chainwheel 13, whereby upon the driving of the shaft 10 by depressing pedals 11 or as driven by an engine (not shown), the two chainwheels 12, 13 will simultaneously drive the two rear wheels 33, 43 to allow all wheels including front wheel 23 contacting the ground surface to increase their friction therewith.

Since the two rear wheels 33, 43 are respectively driven by the driving means 1, this cycle can still be operated even any wheel of the two wheels 33, 43 is broken or any chain of the two chains 35, 45 is broken.

I claim:

1. A multiple-wheel cycle comprising:
    a driving means having a driving shaft rotatably mounted in a bottom bush of a seat tube of a cycle frame and having a right chainwheel and a left chainwheel respectively disposed on two sides of the bush;
    a first rear-wheel means including a lever protruding rearwards and having its inner end formed with a collar pivotedly mounted on said bottom bush and having its outer end formed as an axle for rotatably mounting a first sprocket and a first rear wheel secured with said sprocket, said first sprocket engaged with a chain coupled to said right chainwheel;
    a second rear-wheel means including a lever protruding frontwards opposite to said first rear-wheel means and having its inner end formed with a collar pivotedly mounted on said bottom bush and having its outer end formed as an axle for rotatably mounting a second sprocket and a second rear wheel secured with said second sprocket, said second sprocket engaged with a chain coupled to said left chainwheel; and
    a pair of telescopic cushioning rods each including an outer cylinder secured to said seat tube, an inner cylinder resiliently held within said outer cylinder as tensioned by a spring inserted in said outer cylinder, a cylinder rod protruding downwards under said inner cylinder, a roller formed with an annular groove along the roller perimeter to respectively engage with either said lever of said rear-wheel means, and a hook protruding downwards from a roller pin to movably dispose about either said lever with each said roller, all centers of said two rear wheels and a front wheel of the cycle being projectively aligned;
    whereby upon the rotation of said driving shaft and two said chainwheels, two said rear wheels will be simultaneously driven for their running and upon the meeting of any convex obstacle by either said rear wheel, said rear wheel will be biased upwards around its axle to run on an uneven ground surface.

2. A cycle according to claim 1, wherein said driving shaft is fixed with a pair of pedals respectively disposed on two sides of said bush for manual rotation of said shaft.

3. A cycle according to claim 1, wherein said driving shaft is fixed with an engine-coupled sprocket engaged with a chain coupled to and driven by an engine for mechanically driving said shaft.

4. A multiple-wheel cycle comprising:
    a driving means including a driving shaft rotatably mounted in a bottom bush of a seat tube of the cycle and a right chainwheel and a left chainwheel respectively disposed on two sides of said bush;
    a first rear wheel protruding rearwards from said bottom bush and having a first sprocket rotatably mounted on an axle formed on a lower portion of a rear fork secured to said seat tube, said first sprocket engaged with a chain coupled to said right chainwheel; and
    a second rear wheel protruding frontwards from said bush opposite to said first rear wheel and having a second sprocket rotatably mounted on an axle formed on a lower portion of the other rear fork secured to said seat tube, said second sprocket engaged with a chain coupled to said left chainwheel, all centers of two said rear wheels and a front wheel of the cycle being projectively aligned, whereby upon the rotation of said driving shaft and two said chainwheels, two said rear wheels will be simultaneously driven for running the cycle having the two rear wheels and the front wheel on a ground surface.

* * * * *